Jan. 29, 1963 F. VERES 3,075,860

METHOD OF ADHERING METAL TO A GLASS BASE

Filed Aug. 12, 1958

INVENTORS
FRANK VERES
BY W. A. Schaich
Leonard D. Soubier
ATTORNEYS

United States Patent Office 3,075,860

Patented Jan. 29, 1963

3,075,860

METHOD OF ADHERING METAL TO A GLASS BASE

Frank Veres, Toledo, Ohio, assignor to Owens-Illinois Glass Company, a corporation of Ohio Filed Aug. 12, 1958, Ser. No. 754,666
7 Claims. (Cl. 117—211)

The present invention relates to a method of adhering metal to a glass base, and more particularly to a method of making printed electric circuits utilizing a glass base.

In the manufacture of printed electrical circuits for electronic components, such as television, radar, and the like, it has been proposed that a conductive coating, essentially metallic in nature such as silver, gold, platinum, or the like, be applied in a predetermined path directly to a glass base. The composite structure comprising the glass base and the metallic circuit applied thereto is then heated to a temperature above the fiber softening point of the glass base to effect adherence between and adequate bonding of the two materials. While printed circuits have been made in this manner, warping and/or viscous deformation of the base are encountered due to the firing or heating the composite structure to the high temperatures necessary to obtain adequate bonding of the metal to the glass. Additionally, if the glass base is not cooled slowly, permanent strain will be introduced into the glass. Should the firing be stopped short of the fiber softening point, warping and deformation do not occur, but the adherence of the metal to the glass is so poor as to render the composite structure useless. It has been found that good metal-glass adherence requires temperatures on the order of 1150° F. or higher.

It has now been determined that printed circuits can be manufactured by applying to the glass base a devitrifiable glass composition, applying to the devitrifiable glass composition the conductive material, and then heating the laminated composite structure, including the glass base, the devitrifiable glass composition, and the conductive material, to a temperature in excess of the fiber softening point of the devitrifiable glass composition but less than the annealing point of the base glass. In this manner, warping, deformation, and other distortion of the base glass is avoided, while an extremely adherent bond is obtained between the devitrifiable glass composition and the metal and between the devitrifiable glass composition and the base glass.

The general method above described can be carried out by several different series of manipulative steps. One preferred series of manipulative steps involves the application to the base material of the devitrifiable glass composition in a pattern conforming to the finally desired printed circuit, the application of a complete layer of metal to both the devitrifiable glass composition pattern and to those portions of the base glass exposed intermediate the pattern, the firing or heating of the resultant structure to a temperature in excess of the fiber softening point of the devitrifiable glass composition, and the subsequent physical removal of those portions of the metal layer not adhered to the base glass composition.

One other series of manipulative steps to carry out the general method may involve the printing of the devitrifiable glass composition in a desired pattern, and the subsequent printing thereon of the desired metallic material. After such printing, it is merely necessary to heat the resultant structure to the firing temperature determined by the softening point of the devitrifiable glass composition.

One other method involves the application of a uniform layer of devitrifiable composition so as to completely cover the exposed surface of the base glass, followed by the application thereto of the conductive material in the desired pattern, followed by the firing of the devitrifiable material only.

It is, therefore, an important object of the present invention to provide a new and improved method for making a printed electric circuit on a ceramic base.

It is another important object of this invention to provide a method for the application of a metallic printed circuit to a base glass through the medium of a devitrifiable glass composition interposed between the base glass and the metallic circuit-forming material.

It is a further important object of this invention to provide a new and novel method for the formation of a printed electric circuit on a glass base by the application to the base glass of a devitrifiable glass composition, followed by the application to the devitrifiable glass composition of the metallic circuit-defining material, and subsequently heating the resultant laminated structure to a temperature in excess of the fiber softening point of the devitrifiable glass composition but substantially below the annealing point of the base glass composition.

It is yet another object to provide a method of making a printed circuit or the like wherein a predetermined pattern of conductive material is applied to a base glass through the medium of a devitrifiable glass composition interposed between the conductive material and the base glass and effective, upon heating of the composite structure to a temperature in excess of the fiber softening point of the devitrifiable glass composition only, to bind the conductive material to the base glass.

Other objects and advantages of the invention will appear from the following detailed description taken in conjunction with the annexed drawings, in which:

On the drawings:

FIGURE 3 is a further step in the process also illustrated in FIGURE 2 wherein those portions of the metallic layer not adhering to the devitrifiable glass composition are removed by the use of a brush or the like;

As shown on the drawings:

Figure 1:
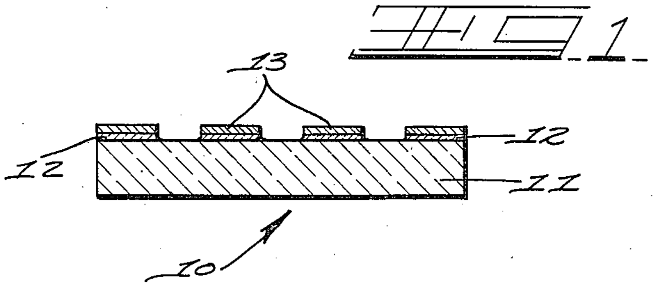
FIGURE 1 is a diagrammatic view illustrating, in section, a printed circuit of the present invention as applied to a ceramic or base glass.

In FIGURE 1, reference numeral 10 refers generally to a printed circuit assembly including a base 11 formed of a suitable base glass composition and reference numeral 12 refers generally to a suitable devitrifiable glass composition utilized to bond to the base 11 the actual circuit-defining metallic pattern 13.

Suitable glass compositions for forming the base 11 include the following:

TABLE I

| Composition | A | B | C | D |
|---|---|---|---|---|
| $SiO_2$ | 64.53 | 61.42 | 65.88 | 62.80 |
| $Al_2O_3$ | 4.3 | 3.08 | 4.37 | 4.23 |
| Cao | 1.1 | 5.99 | 2.21 | 6.38 |
| MgO | 1.0 | ---------- | ---------- | ---------- |
| BaO | 10.6 | ---------- | 9.52 | 8.82 |
| $Na_2O$ | 8.1 | 6.59 | 7.35 | 6.80 |
| $K_2O$ | 10.0 | 9.97 | 9.78 | 10.28 |
| PbO | ---------- | 12.50 | ---------- | ---------- |
| $Sb_2O_3$ | 0.2 | 0.31 | ---------- | ---------- |
| $F_2$ | 0.3 | 0.36 | 0.61 | 0.50 |
| Total | 100.13 | 100.22 | 99.74 | 99.81 |

The above listed compositions are particularly suited for forming the glass base, inasmuch as they have the necessary properties of physical strength, chemical durability and resistance to devitrification. Secondly, the fiber softening points of composition such as those set forth in Table I generally range upwards of 600° C., and the annealing points are generally in excess of 430° C.

For forming the intermediate layer 12, the following devitrifiable glass compositions are suitable.

TABLE II

| | 1 | 2 | 3 | 4 |
|---|---|---|---|---|
| $SiO_2$ | 2.0 | 2.0 | 2.0 | 2.0 |
| $B_2O_3$ | 8.45 | 8.45 | 8.45 | 8.45 |
| BaO | 2.0 | ---------- | 4.0 | 2.0 |
| PbO | 72.71 | 72.71 | 72.72 | 74.72 |
| ZnO | 10.83 | 10.83 | 12.83 | 12.83 |
| CuO | 4.10 | 6.01 | ---------- | ---------- |
| Total | 100.00 | 100.00 | 100.00 | 100.00 |
| F.S.P., ° C | 359 | 367 | 369 | 359 |

Additional compositions which may be utilized for the devitrifiable glass compositions are as follows:

TABLE III

| | 5 | 6 | 7 | 8 | 9 |
|---|---|---|---|---|---|
| $SiO_2$ | 2.0 | 2.0 | 2.0 | 2.0 | 2.0 |
| $B_2O_3$ | 8.45 | 8.45 | 8.45 | 8.45 | 8.45 |
| BaO | ---------- | 1.0 | 4.0 | 5.0 | 6.0 |
| PbO | 76.72 | 75.72 | 74.72 | 74.72 | 74.72 |
| ZnO | 12.83 | 12.83 | 10.83 | 9.83 | 8.83 |
| Total | 100.00 | 100.00 | 100.00 | 100.00 | 100.00 |

Generically, the devitrifiable glass compositions may comprise the following approximate ranges of basic ingredients:

TABLE IV

| | Percent |
|---|---|
| $SiO_2$ | 1–3 |
| $B_2O_3$ | 7–10 |
| BaO | 0–8 |
| PbO | 70–80 |
| ZnO | 7–14 |
| CuO | 0–8 |

It will be noted that the sum of lead oxide, zinc oxide, boron oxide and silica oxide is in excess of 90% and in the majority of the compositions exceeds 93% (see Tables II and III). These compositions have fiber softening point temperatures in the range of from 330 to 400° C., and thermal expansion coefficients which are compatible with the coefficients of the base glass materials set forth in Table I.

The metallic layer 13 is preferably a good conductor of electric current, having a melting point in excess of the fiber softening point of the devitrifiable glass composition 12. Thus, suitable materials include silver, gold, paladium, and platinum.

So far as the manipulative steps of the method of the present invention are concerned, three distinct series of manipulative steps may be carried out, but in each instance certain generic method or process steps are present. First, there is hereinafter set forth the three specific series of manipulative steps followed by consideration of the generic method steps.

*Method I*

First, the base 11 is formed of a suitable base glass composition and is formed, shaped, or cut to the desired size and shape. A suitable composition for the base 11 may be as follows:

| | Percent |
|---|---|
| SiO | 56.6 |
| $Al_2O_3$ | 1.5 |
| BaO | 10 |
| $Na_2O$ | 3 |
| $K_2O$ | 10 |
| PbO | 18.9 |
| Total | 100.00 |

This composition has a fiber softening point of 662° C., an annealing point of 457° C., and a strain point of 425° C.

There is to be applied to the base glass a devitrifiable glass composition corresponding to composition I of Table II having a fiber softening point of 359° C., well below the fiber softening point, the annealing point, and the strain point of the base glass composition.

Figure 2:
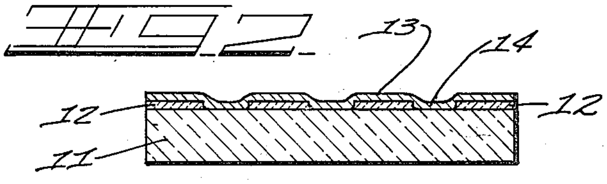
FIGURE 2 is a view similar to FIGURE 1 illustrating a step in one process of the present invention wherein a conductive layer encompasses the entire exposed surface of the base glass and a devitrifiable glass composition applied thereto.

Next, the devitrifiable glass composition is applied to the base 11 in the desired pattern, as illustrated in FIGURE 2 of the drawings. The application of the devitrifiable glass composition 12 to the base 11 may be carried out in any desired manner, as for example by sprinkling the powdered devitrifiable glass composition upon the base glass in the desired pattern, or by painting a suspension of the devitrifiable glass composition thereon in a fluid carrier which is volatilized as fairly low temperatures. Alternatively, the pattern may be applied by xerography techniques.

After the powdered devitrifiable glass composition has been applied to the base 11, a uniform coating of the metallic material 13 is applied uniformly to the composite base and devitrifiable glass composition, as best illustrated in FIGURE 2 of the drawings.

Preferably, this metallic material 13 is applied by spraying or painting on a physical suspension of the metallic particles, those portions 14 of the metallic suspension bridging the spaced portions 12 of the devitrifiable glass composition being in full contact with the base 11.

Next, the laminated structure of FIGURE 2 of the drawings is fired at an elevated temperature in excess of the fiber softening point of the devitrifiable material. The temperature at which the firing takes place is greater than the fiber softening point of the devitrifiable material but less than the annealing point of the base composition 11. Preferably, the firing temperature is less than the annealing point of the base composition and below the range of the strain point of the base composition. In the specific example, a firing temperature of 400° C. is utilized.

Following the firing of the composition, the composite structure is treated to remove from the base composition those portions 14 of the metallic layer which are not bonded to the base glass.

Figure 3:
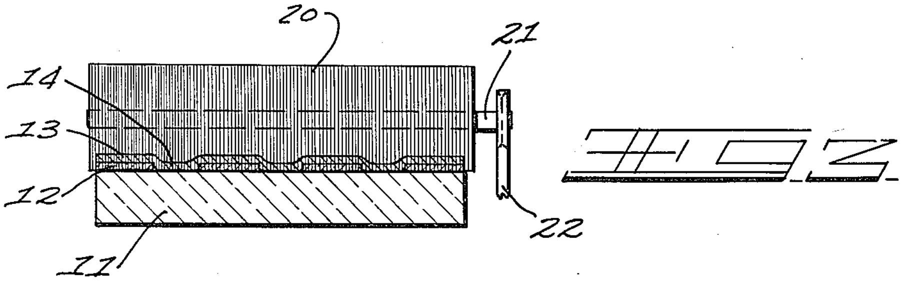

As illustrated in FIGURE 3 of the drawings, this removal can be effected through the medium of a brush 20 secured to a rotatable shaft 21 and rotatable by suitable means, as by a driving belt 22. During the firing of the devitrifiable composition 12, the devitrifiable composition becomes bonded to both the metallic layer 13 and the base 11. Inasmuch as the softening point of the base 11 has not been attained, there is no bonding between the metallic portions 14 and the base 11 and therefore, these portions are readily removed by the brushing.

*Method II*

Figure 4:
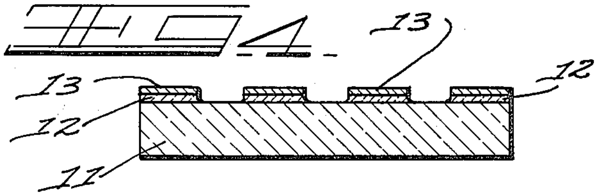
FIGURE 4 is a view similar to FIGURE 1 illustrating a printed circuit obtained by another method of the present invention.

As best illustrated in FIGURE 4, a second method of the present invention comprises the deposition upon the base composition 11 of the devitrifiable composition 12 and then the application, as by an offset printing roll or the like, of a metallic layer 13 to only those devitrifiable portions 12 superimposed upon the base 11. Once again, the composite article is heated to a firing temperature in excess of the fiber softening point of the devitrifiable material and an adequate bond is obtained between the devitrifiable material 12 and the base 11 on the one hand and between the devitrifiable material 12 and the metallic layer 13 on the other hand.

*Method III*

Figure 5:
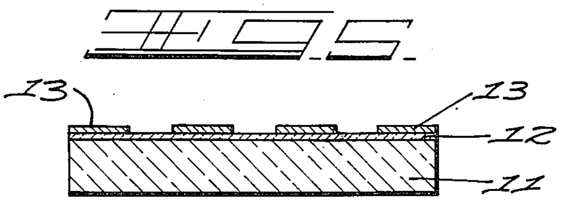
FIGURE 5 is a view similar to FIGURES 1 and 4 illustrating yet another printed circuit obtained by a different method of the present invention.

As indicated in FIGURE 5 of the drawings, a third method involves the manipulative steps of applying a uniform coating 12 of the devitrifiable material so as to completely cover the exposed surface above the base composition 11 followed by the printing thereon of the metallic portions 13 only. Upon firing of the composite article of FIGURE 5, the devitrifiable material will become integrated with the base composition 11 throughout the entire exposed surface thereof, and the metallic portions 13 shall become integrated with the devitrifiable layer 12 so that the desired finished composite article is obtained.

*The Generic Method*

Now that the three specific manipulative methods have been heretofore described, it will be readily appreciated that each of these three methods have in common certain generic steps which in and of themselves provide a new and novel method.

For example, in each of the three methods heretofore explained, a devitrifiable glass composition is initially applied to a base glass composition.

The devitrifiable glass composition preferably consists essentially of 70–80% PbO, 7–14% ZnO, 7–10% $B_2O_3$, 1–3% $SiO_2$, 0–8% BaO and 0–8% CuO, the sum of the PbO, ZnO, $B_2O_3$, and $SiO_2$ for any given composition being in excess of 90%.

Further, the devitrifiable glass composition possesses certain physical characteristics with respect to the base composition, namely a relatively low fiber softening point, preferably of the order of from 330° to 400° C., well below the annealing points of the base compositions and preferably below the strain points of the base compositions.

Manipulatively, the method next involves the application to the devitrifiable glass composition of a conductive material. This conductive material is preferably metallic and has a melting point in excess of the fiber softening point of the devitrifiable glass composition.

Finally, the laminated structure comprising the base glass, the devitrifiable glass composition, and the conductive material is heated to a temperature in excess of the fiber softening point of the composition but less than the fiber softening point of the base glass. This specific, functionally defined temperature range is essential to promote an adequate bond between the devitrifiable glass composition and the base glass and between the devitrifiable glass composition and the conductive material, while at the same time preventing deformation of the base glass composition.

What is claimed is:

1. A method of making a printed circuit or the like wherein a predetermined pattern of particulate conductive metallic material is applied to a glass base consisting of the steps of initially applying to the glass base a devitrifiable glass composition, applying the particulate conductive metallic material to said composition, and heating the resultant laminated structure to a temperature in excess of the fiber softening point of said composition, but less than the annealing point of said glass base.

2. The method of claim 1, wherein said devitrifiable glass composition consists essentially of

| | Percent |
|---|---|
| PbO | 70–80 |
| ZnO | 7–14 |
| $B_2O_3$ | 7–10 |
| $SiO_2$ | 1–3 |
| BaO | 0–8 |
| CuO | 0–8 |

and the sum of the first four listed constitutents is greater than 90% said percentage being by weight of the total composition.

3. The method of claim 1, wherein said temperature is from 330° C. to 400° C.

4. A method of making a printed circuit or the like wherein a predetermined pattern of particulate conductive metallic material is applied to a glass base, consisting of the steps of initially applying to the glass base a devitrifiable glass composition in said predetermined pattern, applying an uninterrupted layer of the particulate conductive metallic material to said composition and the glass base, heating the resultant laminated structure to a temperature in excess of the fiber softening point of said composition, but less than the annealing point of said glass base, and removing those portions of said particulate conductive metallic material layer contacting said glass base.

5. The method of claim 4, wherein said devitrifiable glass composition consists essentially of

| | Percent |
|---|---|
| PbO | 70–80 |
| ZnO | 7–14 |
| $B_2O_3$ | 7–10 |
| $SiO_2$ | 1–3 |
| BaO | 0–8 |
| CuO | 0–8 |

and the sum of the first four listed constituents is greater than 90% said percentage being by weight of the total composition.

6. A method of making a printed circuit or the like wherein a predetermined pattern of particulate conductive metallic material is applied to a glass base, consisting of the steps of initially applying to the glass base a covering layer of devitrifiable glass composition, applying to said composition layer a predetermined pattern of the particulate conductive metallic material, and heating the resultant laminated structure to a temperature in excess of the fiber softening point of said composition, but less than the annealing point of said glass base.

7. A method of making a printed circuit or the like wherein a predetermined pattern of particulate conductive metallic material is applied to a glass base, consisting of the steps of initially applying to the glass base a predetermined pattern of devitrifiable glass composition, applying the particulate conductive metallic material to said composition pattern only, and heating the resultant laminated structure to a temperature in excess of the fiber softening point of said composition, but less than the annealing point of said glass base.

References Cited in the file of this patent

UNITED STATES PATENTS

| | | |
|---|---|---|
| 1,922,674 | Mulder | Aug. 13, 1933 |
| 2,610,127 | Kerridge et al. | Sept. 9, 1952 |

(Other references on following page)

| | | |
|---|---|---|
| 2,615,816 | Dovey et al. | Oct. 28, 1952 |
| 2,701,214 | Velonis | Feb. 1, 1955 |
| 2,916,393 | Velonis | Dec. 8, 1959 |
| 2,951,167 | Kegg et al. | Aug. 30, 1960 |

FOREIGN PATENTS

| | | |
|---|---|---|
| 625,466 | Great Britain | June 28, 1947 |

| | | |
|---|---|---|
| 634,548 | Great Britain | Mar. 22, 1950 |
| 1,111,085 | France | Oct. 26, 1955 |

OTHER REFERENCES

"New Advances in Printed Circuits," Miscellaneous Publication 192, National Bureau of Standards, November 22, 1948, pp. 1, 2, 15, 16 and 17.